United States Patent
Brotherton et al.

(10) Patent No.: US 11,047,115 B2
(45) Date of Patent: Jun. 29, 2021

(54) WATER METER SYSTEM AND METHOD

(71) Applicant: H2Optimize, LLC, Midland, TX (US)

(72) Inventors: Donald J. Brotherton, San Marcos, TX (US); David C. Morrow, Midland, TX (US)

(73) Assignee: H2Optimize, LLC, Midland, TX (US)

( * ) Notice: Subject to any disclaimer, the term of this patent is extended or adjusted under 35 U.S.C. 154(b) by 96 days.

(21) Appl. No.: 15/996,145

(22) Filed: Jun. 1, 2018

(65) Prior Publication Data

US 2018/0347157 A1 Dec. 6, 2018

Related U.S. Application Data

(60) Provisional application No. 62/514,633, filed on Jun. 2, 2017.

(51) Int. Cl.
*E03B 7/07* (2006.01)
*F17D 5/02* (2006.01)

(52) U.S. Cl.
CPC ........... *E03B 7/071* (2013.01); *E03B 7/072* (2013.01); *E03B 7/075* (2013.01); *E03B 7/078* (2013.01); *F17D 5/02* (2013.01)

(58) Field of Classification Search
CPC ......... E03B 7/071; E03B 7/072; E03B 7/075; E03B 7/078; F17D 5/02
See application file for complete search history.

(56) References Cited

U.S. PATENT DOCUMENTS

| | | | |
|---|---|---|---|
| 3,772,917 A | 11/1973 | Lutz et al. | |
| 4,635,668 A * | 1/1987 | Netter | E03B 7/12 137/392 |
| 4,730,637 A * | 3/1988 | White | E03B 7/12 137/468 |
| 5,072,621 A * | 12/1991 | Hasselmann | G01M 3/2892 73/40.5 R |
| 5,220,937 A * | 6/1993 | Roberts | E03B 7/12 122/504 |
| 7,360,413 B2 | 4/2008 | Jeffries et al. | |
| 8,489,342 B2 | 7/2013 | Dugger et al. | |
| 8,561,636 B2 * | 10/2013 | Eithun | F17D 5/02 137/487.5 |
| 8,596,140 B2 * | 12/2013 | Skallebæk | G01F 1/667 73/861.18 |
| 8,620,841 B1 | 12/2013 | Filson et al. | |
| 8,806,957 B2 * | 8/2014 | Laursen | G01F 1/662 73/861.18 |

(Continued)

FOREIGN PATENT DOCUMENTS

| CN | 101718568 A | 6/2010 |
|---|---|---|
| CN | 103776505 A | 5/2014 |

(Continued)

*Primary Examiner* — John Fitzgerald
(74) *Attorney, Agent, or Firm* — Kirby Drake

(57) ABSTRACT

A water meter system and method may provide inline flow monitoring and leak detection that may track real-time water usage. The water meter system and method may utilize one or more dual pressure sensors and/or ultrasonic sensors to detect leaks quickly and automatically turn off a valve. A spool may be utilized that may provide the dual pressure sensors on opposite sides of a ball valve to separate upstream and downstream pressure zones when the valve is closed.

12 Claims, 9 Drawing Sheets

(56) References Cited

U.S. PATENT DOCUMENTS

| | | | |
|---|---|---|---|
| 8,833,384 B2* | 9/2014 | Burt | F24F 11/83 137/80 |
| 8,893,559 B2* | 11/2014 | Drachmann | G01F 1/662 73/861.18 |
| 9,719,234 B1* | 8/2017 | Christopher | E03B 7/12 |
| 9,874,466 B2* | 1/2018 | Leaders | G06F 19/00 |
| RE47,048 E* | 9/2018 | Skallebæk | G01F 1/667 |
| 10,579,075 B2* | 3/2020 | Tahan | G05D 7/0635 |
| 10,732,071 B2* | 8/2020 | Fung-A Wing | G08B 21/18 |
| 10,745,893 B2* | 8/2020 | Silverstein | H04L 12/2816 |
| 2003/0183018 A1 | 10/2003 | Addink et al. | |
| 2005/0190074 A1* | 9/2005 | Cumeralto | G08B 23/00 340/870.02 |
| 2006/0168611 A1* | 7/2006 | Fima | G01M 3/2815 725/10 |
| 2006/0260691 A1* | 11/2006 | Davidoff | G01M 3/2807 137/487.5 |
| 2006/0272830 A1* | 12/2006 | Fima | G01M 3/2807 169/16 |
| 2008/0066812 A1* | 3/2008 | Tornay | F17D 5/06 137/624.11 |
| 2008/0271543 A1* | 11/2008 | Hecht | G01F 15/18 73/861.27 |
| 2008/0302172 A1* | 12/2008 | Kates | G01M 3/2807 73/40.5 R |
| 2010/0045471 A1* | 2/2010 | Meyers | G05D 7/0617 340/605 |
| 2010/0132803 A1* | 6/2010 | Fima | E03B 7/071 137/79 |
| 2011/0050395 A1* | 3/2011 | Ervin | G01M 3/26 340/6.11 |
| 2011/0093123 A1* | 4/2011 | Alexanian | A01G 25/16 700/284 |
| 2011/0146805 A1* | 6/2011 | Foster | E03B 7/071 137/2 |
| 2011/0251807 A1* | 10/2011 | Rada | G01D 4/00 702/61 |
| 2011/0298635 A1 | 12/2011 | Yip | |
| 2012/0006127 A1* | 1/2012 | Nielsen | G01F 1/662 73/861.27 |
| 2012/0031198 A1* | 2/2012 | Skallebaek | G01F 1/662 73/861.18 |
| 2012/0271670 A1* | 10/2012 | Zaloom | G06Q 50/06 705/7.11 |
| 2013/0080081 A1* | 3/2013 | Dugger | G01F 15/063 702/48 |
| 2013/0085688 A1* | 4/2013 | Miller | G01F 1/66 702/48 |
| 2013/0139610 A1* | 6/2013 | Laursen | G01F 1/662 73/861.18 |
| 2014/0149270 A1* | 5/2014 | Lombard | H04L 12/2823 705/34 |
| 2015/0033873 A1* | 2/2015 | Drachmann | G01F 15/14 73/861.18 |
| 2015/0211905 A1* | 7/2015 | Drachmann | H04R 31/006 73/861.28 |
| 2015/0300854 A1* | 10/2015 | Nielsen | G01F 1/66 73/861.27 |
| 2015/0377668 A1* | 12/2015 | Nielsen | G01F 1/662 73/861.27 |
| 2016/0024759 A1* | 1/2016 | Vinjamaram | G05D 7/0635 137/12 |
| 2016/0097663 A1* | 4/2016 | Kim | G01F 1/662 73/861.28 |
| 2016/0116317 A1* | 4/2016 | Zhang | G01F 15/00 73/861.25 |
| 2016/0146650 A1* | 5/2016 | Satou | G01F 1/662 73/861.25 |
| 2016/0161940 A1* | 6/2016 | Max | E03B 7/071 700/282 |
| 2016/0172906 A1* | 6/2016 | Maruyama | H02J 3/38 700/297 |
| 2016/0195418 A1* | 7/2016 | Drachmann | G01F 1/667 73/861.28 |
| 2017/0138023 A1* | 5/2017 | Dooley | F25B 41/00 |
| 2017/0336235 A1* | 11/2017 | Riddick | E03C 1/084 |
| 2017/0362801 A1* | 12/2017 | Van Goor | E03B 7/12 |
| 2018/0010978 A1* | 1/2018 | Bailey | G01P 13/006 |
| 2018/0014480 A1* | 1/2018 | Montgomery | G05B 19/042 |
| 2018/0127957 A1* | 5/2018 | Enev | E03B 7/003 |
| 2019/0063689 A1* | 2/2019 | Liu | G01M 3/2815 |
| 2019/0234786 A1* | 8/2019 | Klicpera | G01F 15/063 |
| 2020/0032494 A1* | 1/2020 | Trescott | G01F 1/696 |
| 2020/0033167 A1* | 1/2020 | Sexton | G01K 13/00 |
| 2020/0080878 A1* | 3/2020 | Banerjee | G01M 3/007 |
| 2020/0146229 A1* | 5/2020 | Montgomery | A01G 25/167 |

FOREIGN PATENT DOCUMENTS

| | | |
|---|---|---|
| CN | 103900765 A | 7/2014 |
| CN | 204214481 U | 3/2015 |
| EP | 1887327 A1 | 2/2008 |
| EP | 3136627 A1 | 3/2017 |

* cited by examiner

600

700A
700B
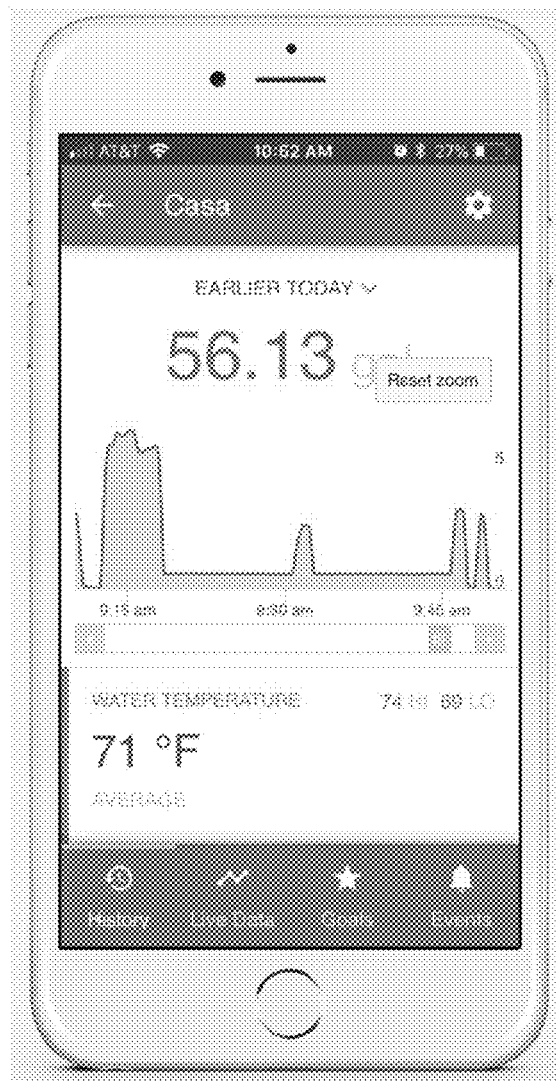
FIGURE 7A
FIGURE 7B 700C
700D
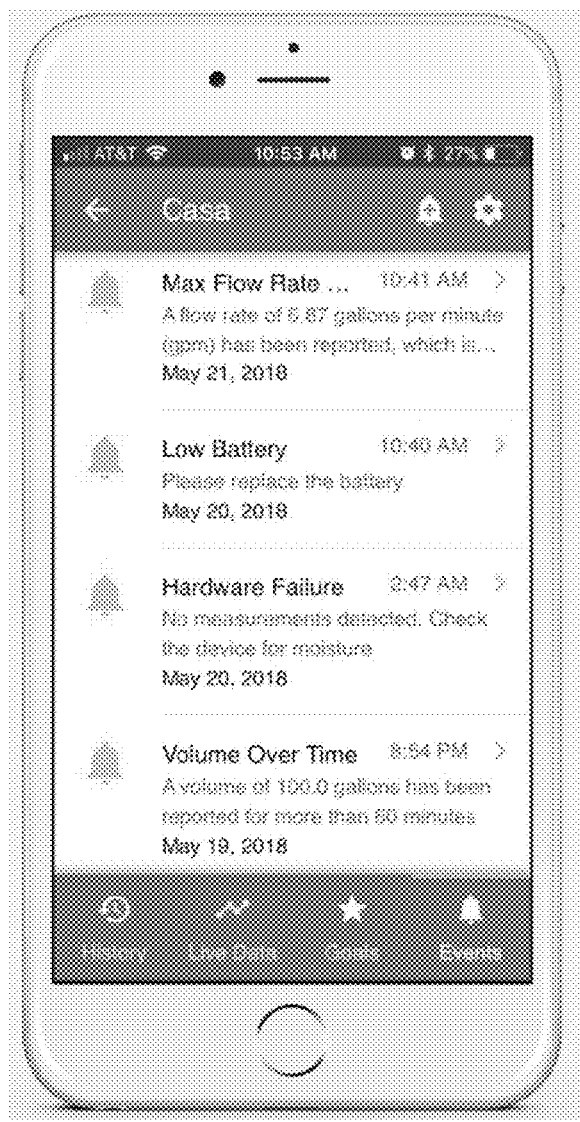
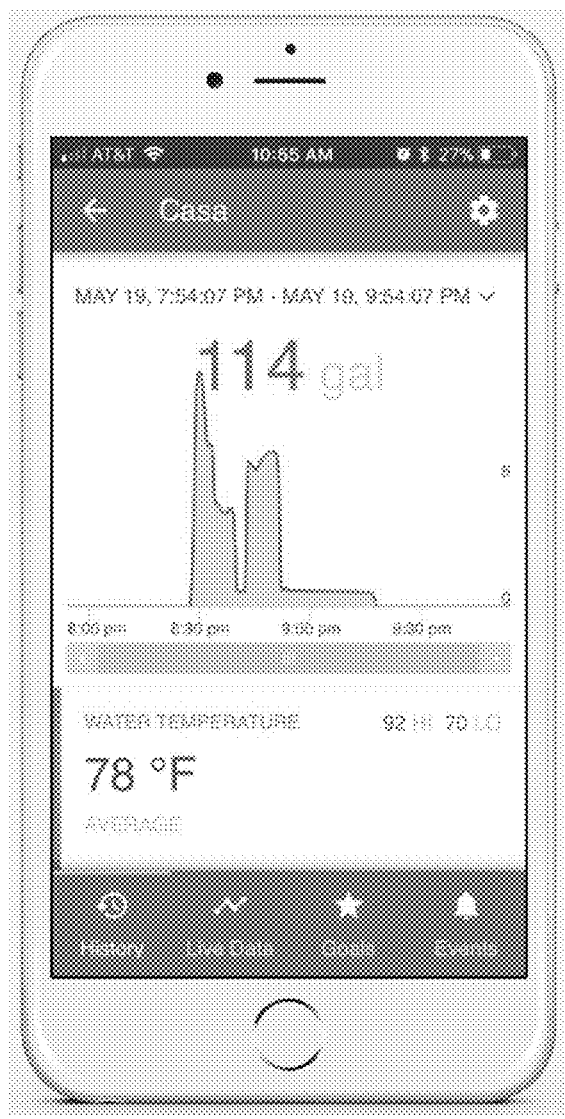
FIGURE 7C
FIGURE 7D 700E
700F
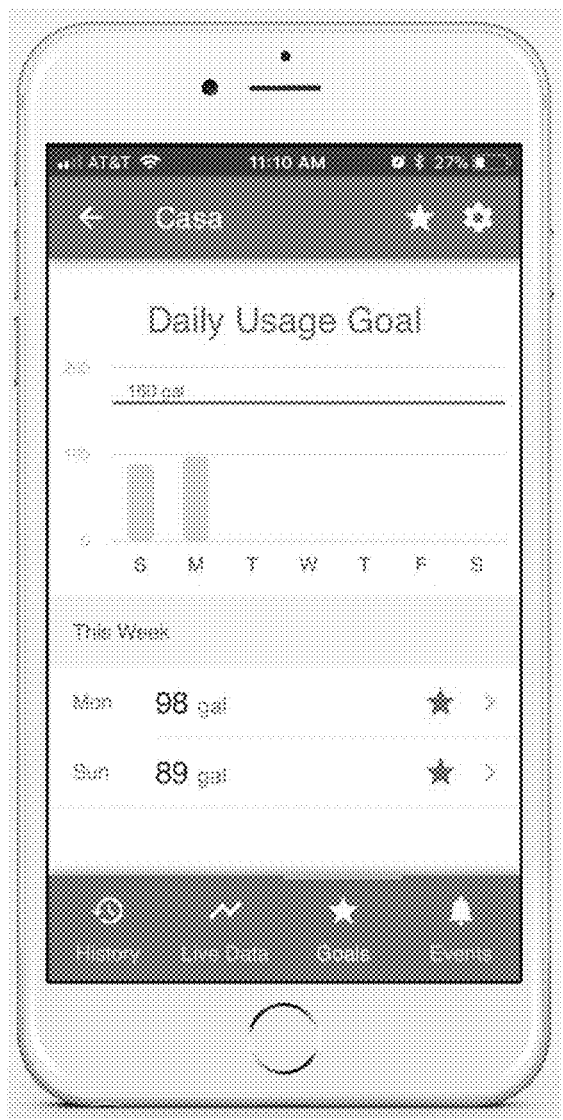
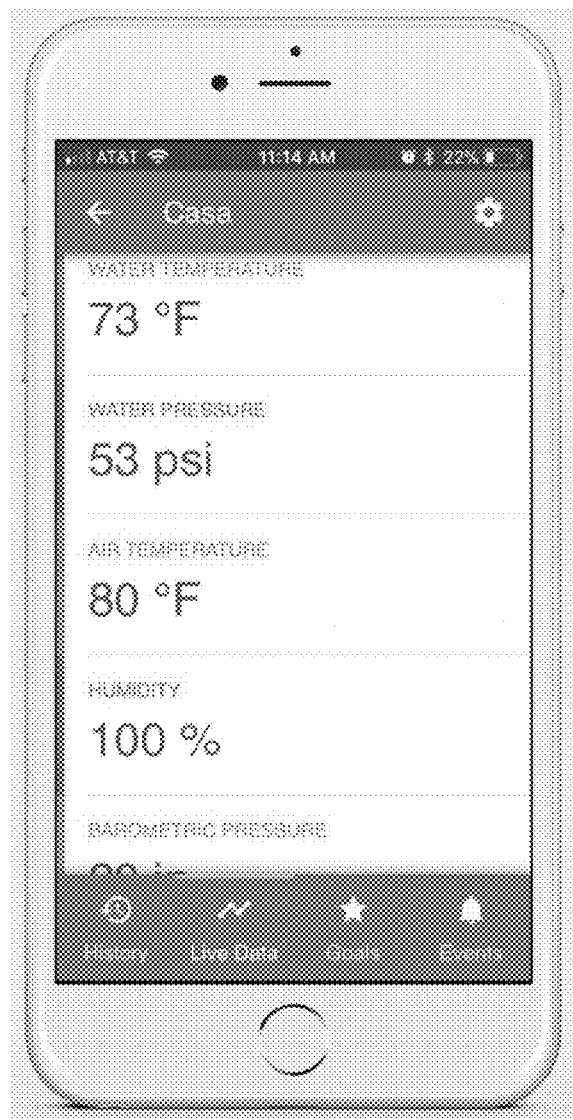
FIGURE 7E
FIGURE 7F

WATER METER SYSTEM AND METHOD

CROSS-REFERENCE TO RELATED APPLICATION

The present application hereby claims priority to Provisional Patent Application No. 62/514,633, filed on Jun. 2, 2017, entitled "WATER METER SYSTEM AND METHOD" which is incorporated herein by reference in its entirety.

TECHNICAL FIELD

The disclosure relates generally to a water meter system and method, and more specifically, to a water meter system and method for providing a user flow alert in real-time and automatically shutting a valve.

BACKGROUND

Less than one percent of all the water on Earth can be used by people. Property damage can result from water damage due to plumbing failures, and pipes that freeze is the second most common cause of homeowner loss. Household leaks can include more than one trillion gallons of water annually nationwide. The Environmental Protection Agency's WaterSense program held Fix-a-Leak Week from Mar. 20-26, 2017 to bring awareness of a need to conserve water. The average household water leak can account for more than 10,000 gallons of water wasted every year, and ten percent of homes have leaks that waste 90 gallons or more per day. Water leaks caused $9.1 billion in annual homeowner policy property losses from 2007 to 2009 including approximately 23 percent of all homeowner property losses. According to the American Insurance Association "[w]ater damage claims have been growing faster than other components of homeowners insurance." In the U.S., water damage is the second most frequently filed insurance claim and has accounted for more than $5 billion of reported claims each year from 1999 to 2003. Water damage claims, mostly from leaky or burst pipes, are the primary cause of rising property-insurance costs. Up to 93% of the cost of water damage can be prevented or minimized if an automatic water leak detection and shut-off system is present in the homes, according to an ACE Private Risk Services study of damage sustained by affluent homeowners.

SUMMARY

Embodiments of the present disclosure may provide a water meter that may include at least one ultrasonic sensor that may be arranged in a water meter body and provided to detect and trace leaks in real-time. A ball valve may be configured to remotely close, and dual pressure sensors may be arranged on each side of the valve. The dual pressure sensors may be arranged to separate upstream pressure zones from downstream pressure zones when the ball valve is closed. The water meter may further provide a power source that may include a solar panel, an adapter, a battery, and/or another energy source. When the water meter automatically detects low flows and leaks, the power source may automatically turn the water meter on or off. Specialized fittings may be configured to allow a user to install the system. The water meter may be connected to a water meter application, and the water meter application may be configured to display and notify a user of a water flow rate increase in real-time. The water meter may minimize flow turbulence and cavitation, and the ball valve may be configured to remotely close and shut off water supplied to various locations. The water meter may include an angled sensor port that may be arranged to extend from the water meter body and monitor a water temperature.

Other embodiments of the present disclosure may provide a metering system that may include a first and a second ultrasonic sensor. The first and second ultrasonic sensors may be provided to detect and trace leaks in real-time. A ball valve may be configured to remotely close, and dual pressure sensors may be arranged on each side of the ball valve. A power source be made of a solar panel, an adapter, a battery, and/or another energy source. When the metering system automatically detects low flows and leaks, the power source may automatically turn the metering system on or off. A water flow, a gas flow, or a combination of the water flow and the gas flow may be monitored to detect and trace leaks in real-time. Flow irregularities within the metering system may be communicated to a user in real-time. A dashboard may be connected to the metering system, and the dashboard may be configured to display the flow irregularities and metering system data to the user. The metering system may minimize flow turbulence and cavitation. The metering system may be solely battery-powered.

Embodiments of the present disclosure may provide a method of operating a water meter system. The method of operating the water meter system may provide the steps of detecting and tracing leaks in real-time, by a processor, and utilizing at least one ultrasonic sensor. The method may include remotely closing a ball valve, wherein dual pressure sensors may be arranged on each side of the ball valve. The method may provide powering the water meter system with a solar panel, an adapter, a battery, and/or another energy source. Installing the water meter system may utilize specialized fittings, and the specialized fittings may be configured to allow a user to install the system. The method may provide the step of notifying the user in real-time of flow irregularities within the metering system. The method may further include displaying the flow irregularities and metering system data on a dashboard. The method may provide the step of transmitting detected leaks to the metering system from the at least one ultrasonic sensor that may provide leak detection logic.

Other technical features may be readily apparent to one skilled in the art from the following drawings, descriptions and claims.

BRIEF DESCRIPTION OF THE DRAWINGS

For a more complete understanding of this disclosure and its features, reference is now made to the following description, taken in conjunction with the accompanying drawings, in which:

FIG. 7A is a view of a screenshot displaying a water meter application according to an embodiment of the present disclosure;

FIG. 7B is another view of a screenshot displaying a water meter application according to an embodiment of the present disclosure;

FIG. 7C is an additional view of a screenshot displaying a water meter application according to an embodiment of the present disclosure;

FIG. 7D is a view of a screenshot displaying a water meter application according to an embodiment of the present disclosure;

FIG. 7E is another view of a screenshot displaying a water meter application according to an embodiment of the present disclosure; and FIG. 7F is an additional view of a screenshot displaying a water meter application according to an embodiment of the present disclosure.

DETAILED DESCRIPTION

Embodiments of the present disclosure may generally provide a water meter system.

Figure 1:
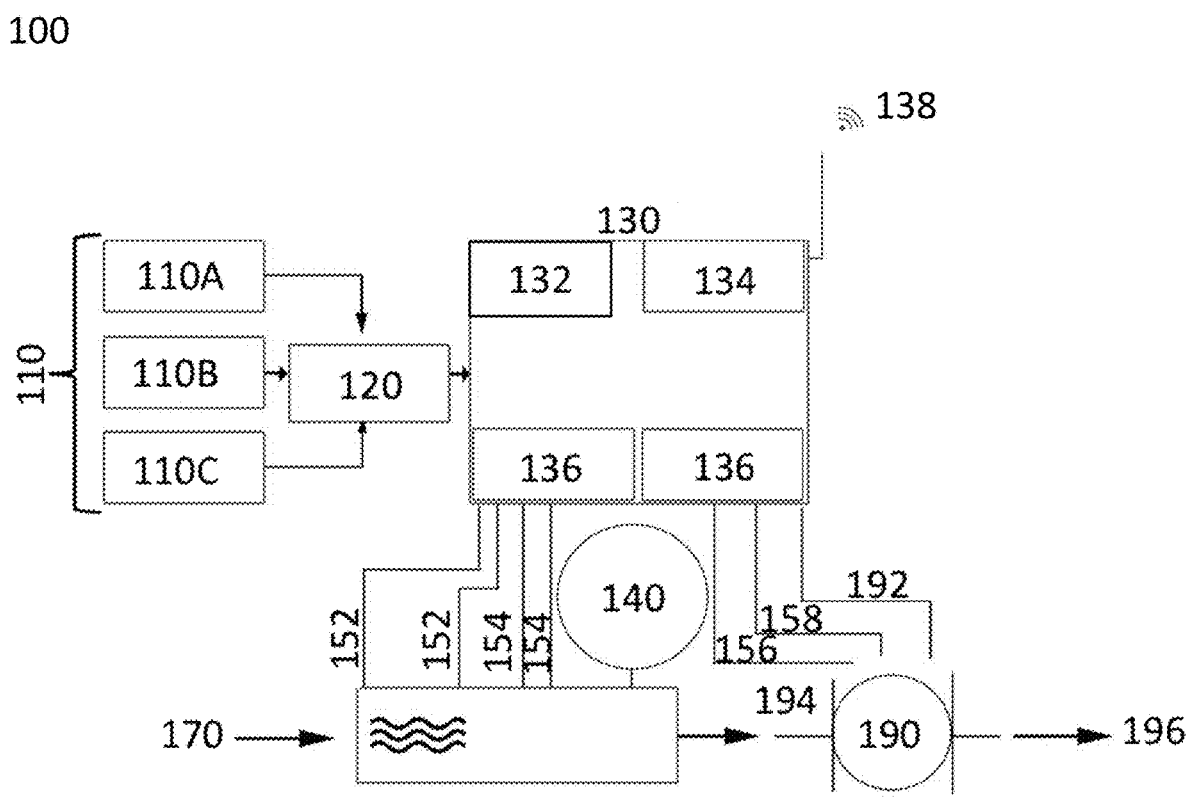
FIG. 1 is a view of a water meter system including an ultrasonic water meter according to an embodiment of the present disclosure.

FIG. 1 depicts water meter system 100 according to an embodiment of the present disclosure. Water meter system 100 may be powered by power source 110 including, but not limited to, solar panel 110A, adapter 110B, and/or battery 110C. It should be appreciated that adapter 110B may be a 110V AC to 3.6V-5V DC adapter or another type of adapter without departing from the present disclosure. It should also be appreciated that battery 110C may be a 3.6-Volt battery that may be a D battery or batteries with other voltages and/or sizes without departing from the present disclosure. Power source 110 may be connected to power switch 120 that may provide an automatic detection feature and may turn on ultrasonic water meter 130. It should be appreciated that power switch 120 may provide 5 volts in an embodiment of the present disclosure. It should be appreciated that power switch 120 may provide more or less than 5 volts without departing from the present disclosure.

Ultrasonic water meter 130 may utilize one or more printed circuit boards (PCBs) 132 and/or Zigbee radio or System-on-Chip (SoC) 134. One or more PCBs 132 may provide ultra-low power, a reset button, and light emitting diodes (LEDs) that may be indicators. Zigbee radio 134 may be provided for long-range and obstruction interference minimization. Further, Zigbee radio 134 may be provided for 2.4 GHz wireless applications, 5.0 GHz wireless applications, or sub-G variations. It should be appreciated that a Zigbee hub or gateway may be used for easily connecting a home network via Wi-Fi 138 to water meter system 100 and may provide a longer range of communication between water meter system 100 and a water meter, such as water meter 140. It should be appreciated that a universal serial bus (USB) may be utilized to connect the Zigbee hub or gateway to radio dongles without departing from the present disclosure. It should also be appreciated that an adapter may provide power and connect the Zigbee hub or gateway to sensors and/or devices without departing from the present disclosure. It should be appreciated that the adapter may be a 110V AC to 4V DC adapter or another type of adapter without departing from the present disclosure. It should be appreciated that a Zigbee hub or gateway may connect up to approximately 250 Zigbee devices to including, but not limited to, Zigbee moisture sensors, flow sensors, U.S. level sensors, and other types of sensors and devices.

Ultrasonic water meter 130 may provide a plurality of terminals 136 that may be for an ultrasonic sensing Time-of-Flight (ToF) microprocessor and sensing an ambient humidity temperature. It should be appreciated that terminals 136 may be provided with sensors including, but not limited to, ultrasonic sensors 152, pressure sensors 154, temperature sensors, humidity sensors, power control 156, and motor control 158. Water meter 140 may be connected to water supply 170, may include a brass spool, and may be an ultrasonic ToF meter in embodiments of the present disclosure. It should be appreciated that brass alloy body 270 (FIGS. 2A-3A, 4, and 5B) may be made of non-brass materials including, but not limited to, stainless steel, polyethylene, and/or other materials without departing from the present disclosure. It should be appreciated that water meter system 100 and ultrasonic water meter 130 may provide a high resolution for low-flow leak detection. It should further be appreciated that low-power DC electric ball valve 190 may include internal open valve limit switch 192 and internal closed valve limit switch 194 that may report to and be controlled by a microcontroller. When water leaves low-power DC electric ball valve 190, the water may be sent to locations 196 that may include, but are not limited to, homes, restaurants, irrigation systems, and apartment buildings.

It should be appreciated that water meter system 100 may be monitored and/or controlled over any web browser. It should also be appreciated that water meter system 100 may include a mobile application that may provide advanced features and may receive and/or send alerts. An Internet cloud may receive and/or send information from and/or to water meter system 100 and may be connected to one or more cloud servers operating in connection with one or more databases and/or a Wi-Fi router. It should be appreciated that water meter system 100 may provide leak detection where water meter system 100 may monitor a main water source and may provide an omniscient view of an entire house or another area. Water meter system 100 may quickly detect small leaks and alert a user in real-time so that the user may instantly reduce water damage and minimize waste. Water meter system 100 may provide a remote valve control which may remotely shut-off water supplied to locations 196 that may include, but are not limited to, homes, restaurants, irrigation systems, and apartment buildings. It also should be appreciated that locations 196 may be a house or another area remote from the user, such as his/her office, a vacation destination, or anywhere the user may be located when a leak is detected. Water meter system 100 may provide ease of installation that may simplify and ensure installation success. Water meter system 100 may provide a do-it-yourself connector kit and may utilize brass fittings. Water meter system 100 may provide identification of each water outlet with a unique signature by monitoring start, stop, flow and volume.

It should be appreciated that water meter placements may provide approximate locations for placing water meters. Water meter placements may include, but are not limited to, next to a city meter, through a basement floor, in an attic, under a pier and beam floor, outside of a wall, through a foundation wall, in a water well house, in a rain catchment barn, in a mud room, and/or inside of a wall pocket. It should be appreciated that water meter system 100 (FIG. 1) may be placed in other locations without departing from the present disclosure. It should be appreciated that water meter may be a primary or main meter for utilization in utility and municipal environments. It should be appreciated that obstructions may include, but are not limited to, exterior walls, multiple interior walls, floors, and ceilings. It should be appreciated that users may select a variety of fittings that may connect to their plumbing including, but not limited to, copper, galvanized materials, crosslinked polyethylene (PEX), and polyvinyl chloride (PVC). Factors that may be considered when placing water meter system 100 (FIG. 1) may include, but are not limited to, end node and Hub design, the Zigbee radio from node to hub, the hub connection via Wi-Fi to a home network, and the hub having a USB that may allow users to add different wide area radios if a Wi-Fi or Zigbee to Ethernet are not available.

Figure 2A:
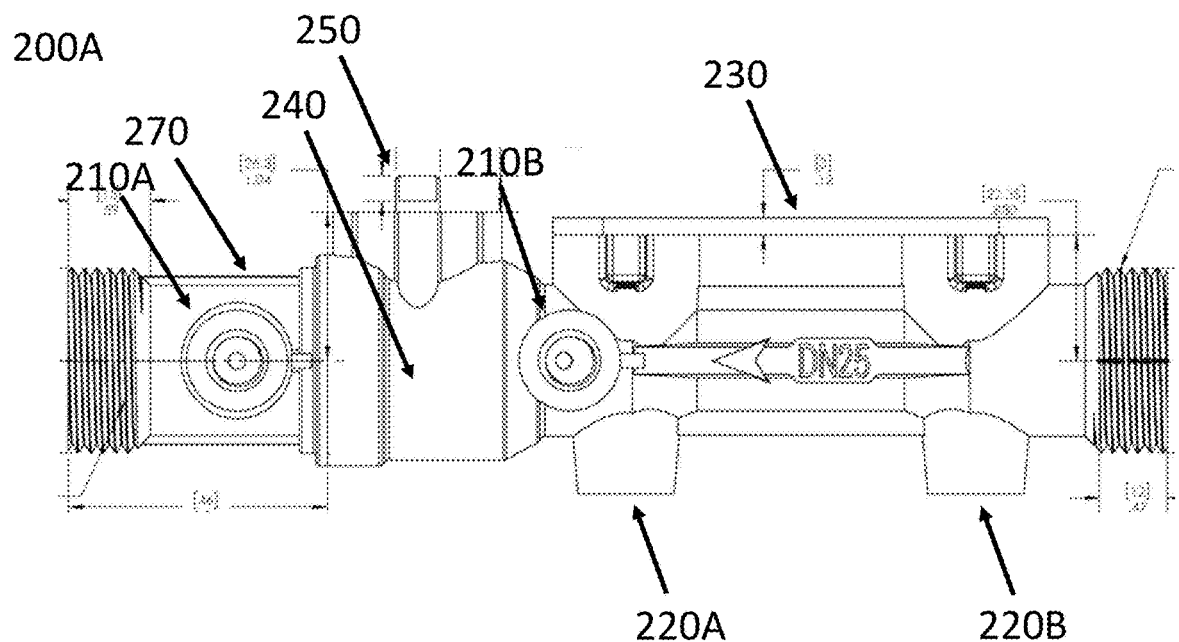
FIG. 2A is a side view of water meter system according to an embodiment of the present disclosure.
Figure 2B:
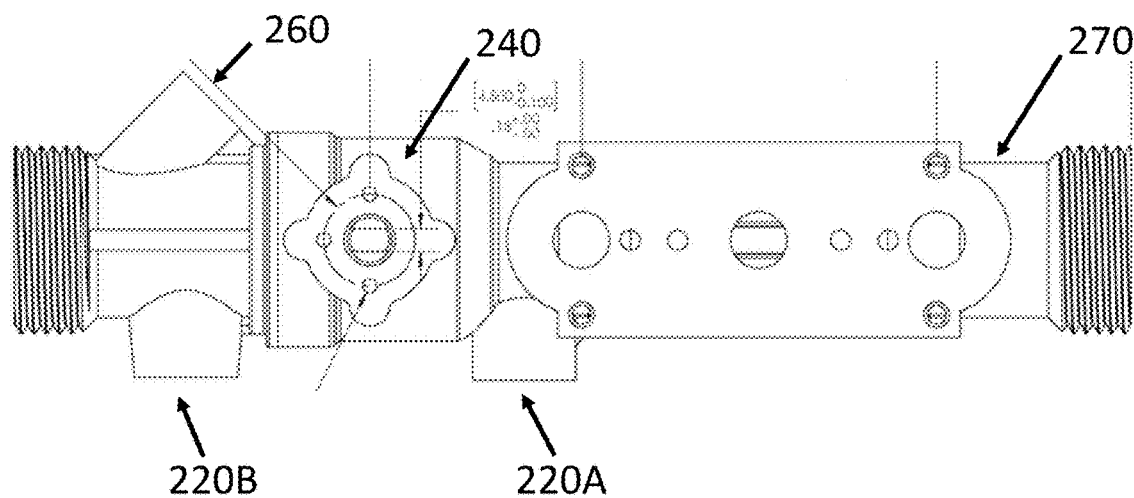
FIG. 2B is a bottom view of water meter system according to an embodiment of the present disclosure.
Figure 3A:
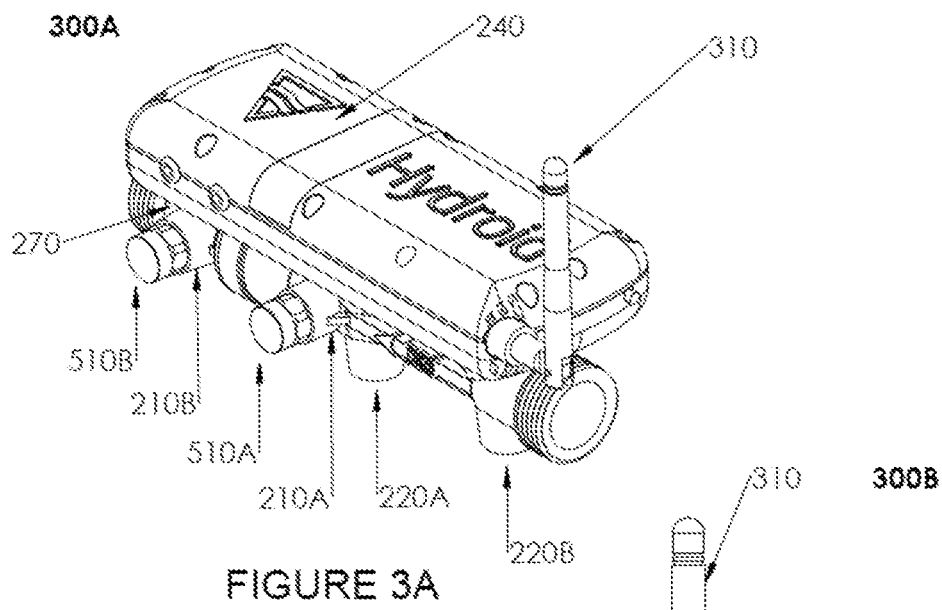
FIG. 3A is a perspective view of water meter system according to an embodiment of the present disclosure.
Figure 3B:
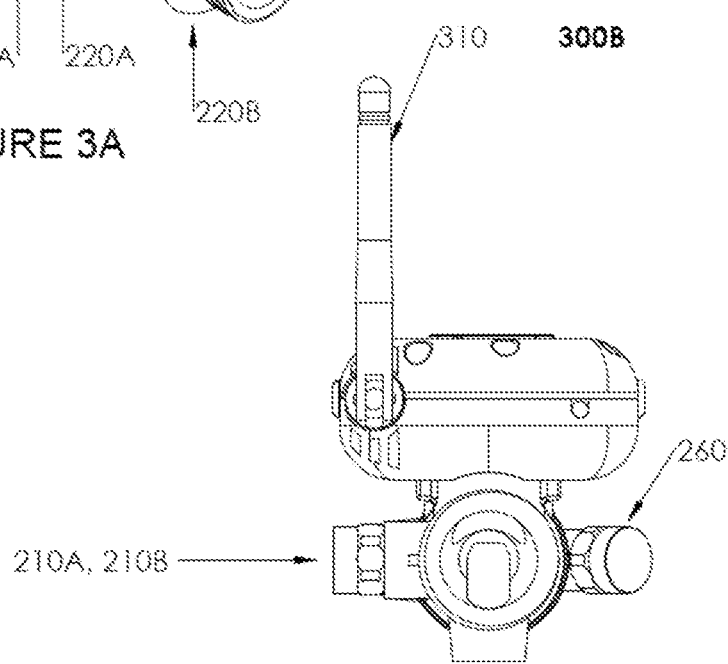
FIG. 3B is a side view of water meter system according to an embodiment of the present disclosure.
Figure 3C:
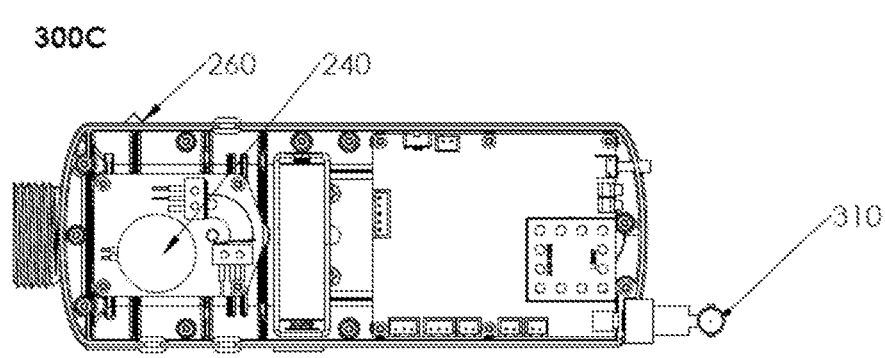
FIG. 3C is a bottom view of water meter system according to an embodiment of the present disclosure.
Figure 4:
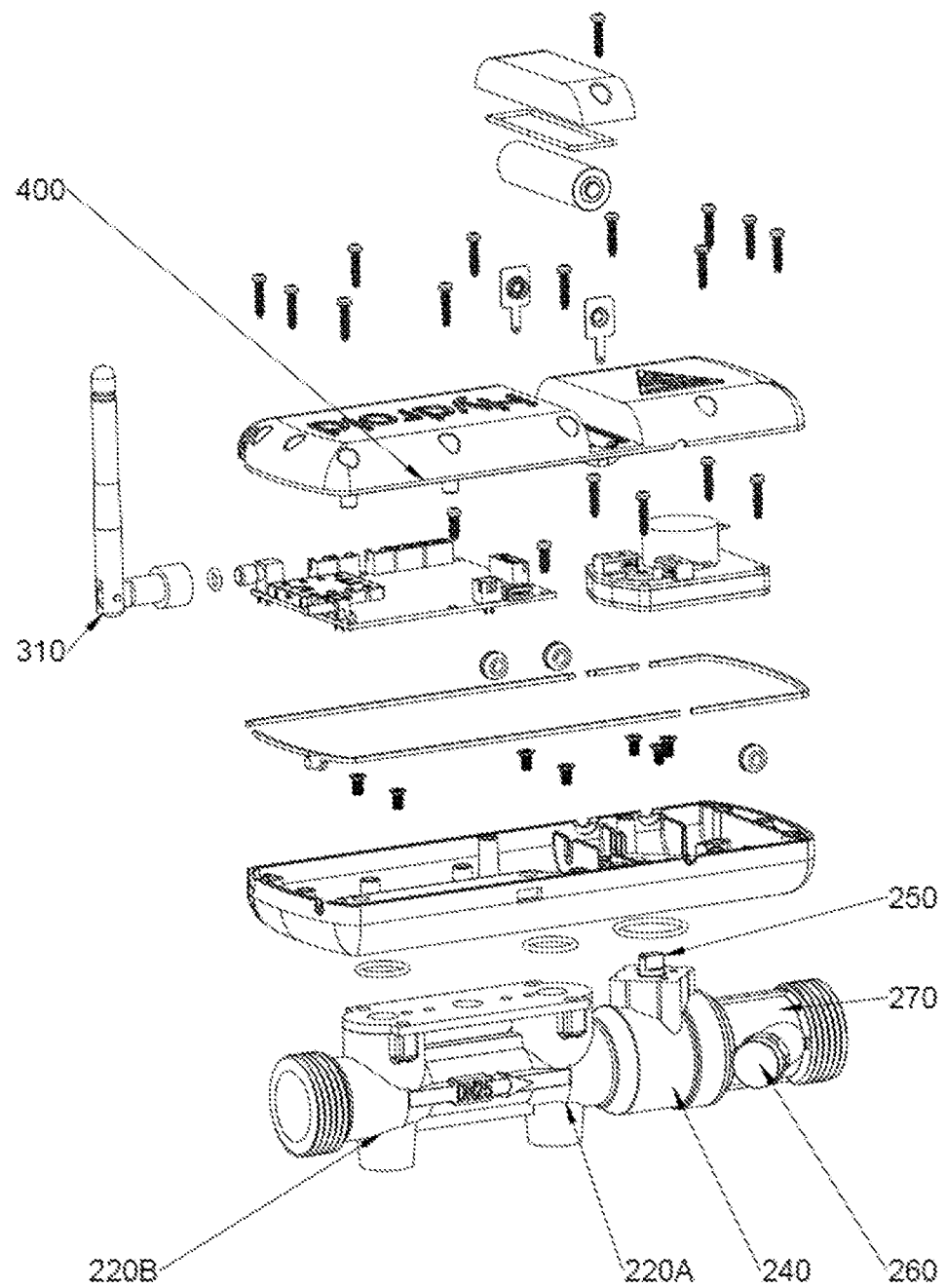
FIG. 4 is an exploded view of a water meter according to an embodiment of the present disclosure.
Figure 5A:
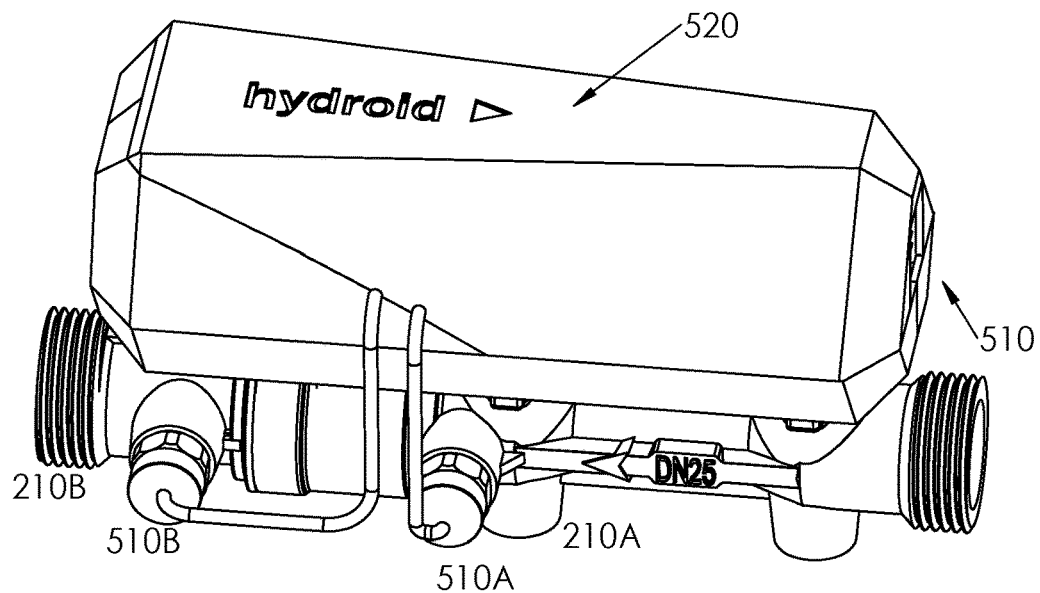
FIG. 5A is a view of a water meter system including a cover according to an embodiment of the present disclosure.

FIGS. 2A and 2B depict water meter body 200A, 200B, respectively, according to an embodiment of the present disclosure. Water meter body 200A, 200B may provide a unique spool design that may provide two sensor ports 210A, 210B (FIGS. 2A, 3A, and 5A) that may be utilized to place or connect pressure sensors 510A, 510B (FIGS. 3A and 5A). The unique spool design may provide brass alloy body 270 (FIGS. 2A-3A, 4, and 5B). It should be appreciated that brass alloy body 270 may be made of non-brass materials including, but not limited to, stainless steel, polyethylene, and/or other materials without departing from the present disclosure. Pressure sensors 510A, 510B (FIGS. 3A and 5A) may be placed on either side of ball valve 240 (FIGS. 2A-3A, 4, and 5B) that may provide separation of upstream pressure zones from downstream pressure zones when ball valve 240 (FIGS. 2A-3A, 4, and 5B) is closed.

Ultrasonic sensors 220A, 200B may extend below water meter body 200A, 200B and may be connected to ultrasonic top plate 230 (FIG. 2A). Water meter body 200A, 200B may provide leak tracking and may minimize flow turbulence and cavitation. Two sensor ports 210A, 210B (FIGS. 2A, 3A, and 5A) may have approximately 1/16" diameter holes, as opposed to standard 1/4" diameter holes. It should be appreciated that sensor ports 210A, 210B may be utilized to place or connect pressure sensors 510A, 510B (FIGS. 3A and 5A) without departing from the present disclosure. Angled sensor port 260 (FIGS. 2B, 3B, 3C, and 5B) may be arranged to extend diagonally from water meter body 200B at approximately a 30-degree angle. It should be appreciated that angled sensor port 260 may be utilized with a temperature sensor without departing from the present disclosure.

FIGS. 3A, 3B, 3C, and 4 depict water meter 300A, 300B, 300C, and 400, respectively, according to an embodiment of the present disclosure. Water meter 300A, 300B, 300C, and 400 may include brass alloy body 270 (FIGS. 2A-3A, 4, and 5B) which may provide ultrasonic sensors 220A, 220B (FIGS. 2A, 2B, 3A, 4, and 5B) that may extend below water meter body 200A, 200B. Ultrasonic sensors 220A, 220B may provide flow recognition, a remote shut-off that may remotely control ball valve 240 (FIGS. 2A-3A, 4, and 5B), two sensor ports 210A, 210B (FIGS. 2A, 3A, and 5A) that may be utilized to place or connect pressure sensors 510A, 510B (FIGS. 3A and 5A), and leak detection logic. It should be appreciated that ultrasonic sensors 220A, 220B may provide flow recognition without departing from the present disclosure. It should further be appreciated that any number of ultrasonic sensors 220A, 220B (FIGS. 2A, 2B, 3A, 4, and 5B) may provide flow recognition without departing from the present disclosure. However, it should be appreciated that there may be embodiments where one or more of these components may be omitted without departing from the present disclosure. It should be appreciated that brass alloy body 270 (FIGS. 2A-3A, 4, and 5B) may be made of non-brass materials including, but not limited to, stainless steel, polyethylene, and/or other materials without departing from the present disclosure.

Water meter 300A, 300B, 300C, and 400 may utilize ultrasonic sensors 220A, 220B (FIGS. 2A, 2B, 3A, 4, and 5B) to detect a low flow. Water meter 300A, 300B, 300C, and 400 may provide one or more different settings that may be provided for a user who may be away from home and/or for a user who may be at home. It should be appreciated that a setting for a user who is away from home may allow for increasing flow sensitivity by reporting anything but zero flow, reducing time to report flows, reporting time of flows, especially a longer flow time than usual, and providing bypass settings that may remove known flows from an analysis. Water meter 300A, 300B, 300C, and 400 may provide dual pressure sensors 510A, 510B (FIGS. 3A and 5A) that may straddle ball valve 240 (FIGS. 2A-3A, 3C, 4, and 5B) which may be a remote-controlled valve. Water meter 300A, 300B, 300C, and 400 may further provide pressure sensors 510A, 510B (FIGS. 3A and 5A) that may monitor pressure including, but not limited to, under pressure, over pressure, and/or a change in pressure that may indicate a problem that may be in a water line. Angled sensor port 260 (FIGS. 2B, 3B, 3C, and 5B) may be arranged to extend diagonally from water meter body 200A at approximately a 30-degree angle. It should be appreciated that angled sensor port 260 may be utilized with a temperature sensor without departing from the present disclosure.

Water meter 300A, 300B, 300C, and 400 may monitor excessive flow in connection with a water tank/pump, rain catchment, and municipality bill tiering, such as, when flow moves a total volume up in a billing tier. However, other monitoring may be performed without departing from the present disclosure. Water meter 300A, 300B, 300C, and 400 may provide leak tracing that may include, but is not limited to, monitoring for a possible leak, allowing the user to monitor for loss of pressure that may indicate a leak on an upflow or downflow side of the valve, and isolating downstream and upstream leaks. After a possible leak has been detected, the valve may be closed and may utilize pressure sensors that may further trace the leak.

According to embodiments of the present disclosure, water meter 300A, 300B, 300C, and 400 may provide an inclement weather and freeze detection warning system. Water meter 300A, 300B, 300C, and 400 may provide predictive analysis. It also may analyze one or more of the following: air temperature, water temperature, and humidity. Water meter 300A, 300B, 300C, and 400 may leverage three inputs that may warn against freezing pipes. Water meter 300A, 300B, 300C, and 400 may provide a first input that may include a water flow sensor that may monitor the temperature of water. A second input may be an air temperature sensor that may monitor air temperature at water meter 300A, 300B, 300C, and 400. A third input may be a weather forecast input that may operate in communication with online sources, such as the Weather Channel. Water meter 300A, 300B, 300C, and 400 may analyze water temperature and may determine whether falling temperatures negatively affected a pipe. Water meter 300A, 300B, 300C, and 400 may analyze air temperature and allow a user to view whether an attic, basement, or well house may be nearing freezing temperatures. Water meter 300A, 300B, 300C, and 400 may provide online support that may deliver forecasts that may help customer anticipate future weather patterns. It should be appreciated that if water temperatures are detected as being close to or below freezing, a pressure sensor may look for an increase in pipe pressure that may indicate freezing water in the pipe.

According to embodiments of the present disclosure, water meter 300A, 300B, 300C, and 400 may be utilized in utility and municipality environments. Water meter 300A, 300B, 300C, and 400 may provide early leak detection and notification, leak tracing that may utilize pressure sensors and at least one valve, and early notifications to a user about excessive water use. Water meter 300A, 300B, 300C, and 400 may further provide notifications to a user of a potential leak and may connect to a city network by utilizing one or more communication networks, including, but not limited to, Wi-Fi, cellular networks, or other AMI radio connection through a hub universal serial bus (USB) port. Antenna 310 may be utilized to better connect to networks. It should be appreciated that antenna 310 may be an external reverse polarity sub-miniature version A (RP-SMA) antenna without departing from the present disclosure. Payment management may be provided by remotely shutting a valve if there is a late payment or failure to pay a bill. Water meter 300A, 300B, 300C, and 400 may limit liability by alerting a user of leaks. Users may be provided with time to shut the valve and/or systems may provide a utility company with permission to remotely shut the valve. It should be appreciated that a user agreement with a utility company may prevent damage that may occur from a leak by utilizing a remote shut-off valve.

According to an embodiment of the present disclosure, a method of data flow may be utilized in either a home or a business environment, and an end device may transmit data to a gateway via ZigBee or another similar communication mechanism in embodiments of the present disclosure. The gateway may transmit data to the cloud and to a data acquisition (REST) service that may store data in a database, based on configurations of each home and/or business. Data may be displayed to users via a web application (website) or a web service (app). Commands may be sent to the end device via the app or the website. Commands may be stored in the database and may be processed by the gateway that may control the end device in embodiments of the present disclosure.

According to an embodiment of the present disclosure, a production schedule may include determining hardware design and manufacturing, administration of data, as well as a cloud user interface (UI) and/or a mobile application. It should be appreciated that the production schedule may include one or more benchmarks or statuses in connection with each item. For example, with respect to the cloud UI, the benchmarks may include, but are not limited to, user experience, leaks, alerts, goals, multi-device home, scheduling and security, while the mobile app may have benchmarks including, but not limited to, design, build, integrate, test, and security. With each item on the production schedule, a color-coding or shading may be used to indicate where the manufacturer is in the production schedule. The production schedule may further include determining design, production, and pricing of a radio daughter board, firmware, power supply, and an enclosure. The production schedule may provide determining production, testing, and pricing of a PCB, sensors, firmware, and an enclosure. Again, it should be appreciated that the production schedule may include various benchmarks or statuses in connection with each item. For example, with a PCB, the production schedule may indicate the revision status and/or when the PCB is in production. With the enclosure, the production schedule may indicate whether it is in design phase, prototype phase, testing phase, and/or pricing phase.

Figure 5B:
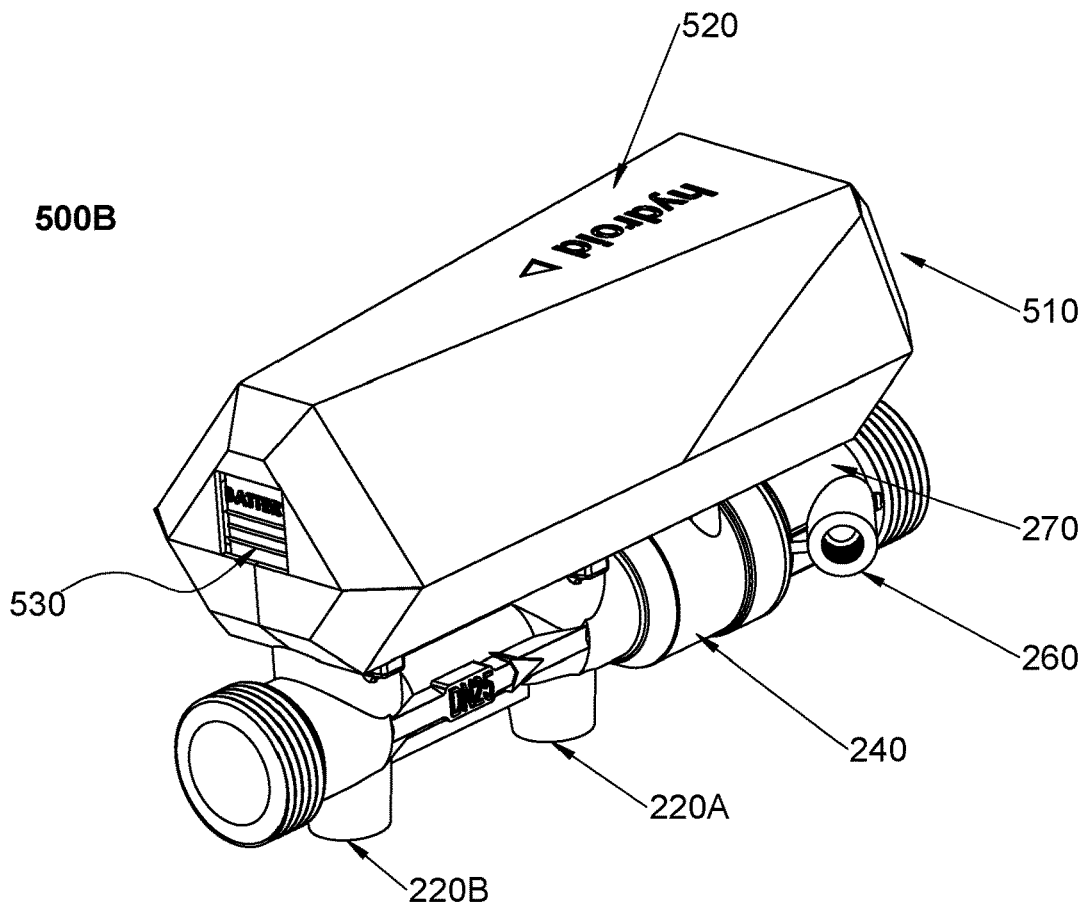
FIG. 5B is another view of a water meter system including a cover according to an embodiment of the present disclosure.

FIGS. 5A and 5B depict water meter body 500A, 500B respectively including cover 510 and battery compartment 520 (FIG. 5B) according to an embodiment of the present disclosure. Water meter body 500A, 500B may include button 530 (FIG. 5B) that may provide access to an upper section of water meter 500A, 500B. A user may press or otherwise activate button 530 which, in response, may open the upper section of water meter 500A, 500B. Water meter body 500A, 500B may provide two sensor ports 210A, 210B (FIGS. 2A, 3A, and 5A) below and outside of cover 510 that may be utilized to place or connect pressure sensors 510A, 510B (FIG. 5B). Angled sensor port 260 (FIGS. 2B, 3B, 3C, and 5B) may be arranged to extend diagonally from water meter body 500B at approximately a 30-degree angle. It should be appreciated that angled sensor port 260 may be utilized with a temperature sensor without departing from the present disclosure. It should also be appreciated that angled sensor port 260 may be utilized with any type of sensor including, but not limited to, a water quality sensor, a sensor that determines whether solids have dissolved, a pH sensor, and a chemical identifier sensor. Ultrasonic sensors 220A, 220B (FIGS. 2A, 2B, 3A, 4, and 5B) may be positioned around along brass alloy body 270 (FIGS. 2A-3A, 4, and 5B). Ultrasonic sensors 220A, 220B may provide flow recognition, a remote shut-off that may remotely control ball valve 240 (FIGS. 2A-3A, 4, and 5B), two sensor ports 210A, 210B that may be utilized to place or connect pressure sensors 510A, 510B (FIGS. 3A and 5A), and leak detection logic.

It should be appreciated that water meter 200A-500B (FIGS. 2A-5B) may be a smart meter system and provide advantages over conventional water meters including, but not limited to, water flow monitoring; water flow metering; leak detection; alert notifications that may be based on leak identification, cost efficiency, volume, and/or run-time; freeze warnings that may be based on monitoring water temperature and/or air temperature; humidity monitoring; pressure monitoring to prevent low pressures and over pressuring; leak tracing by utilizing pressure sensors; remote control operation including opening and/or closing valves remotely; battery-operated units provided to be long-lasting and for use in hard to reach places; ZigBee radio communication for long-range and obstruction interference minimization; and a Wi-Fi-to-ZigBee hub to provide ease of connectivity to home networks and longer range access to meters. It should be appreciated that water meters 200A-500B may further provide advantages over conventional water meters including, but not limited to, flow scheduling provided to set opening and/or closing times and flow volumes, goal setting, city price tier monitoring, ease of installation including specialized fittings for do-it-yourself installation, irrigation and flow bypass capability provided to identify scheduled flow times, multi-unit monitoring, multi-unit comparisons, and setting water flow by time and volume.

Figure 6:
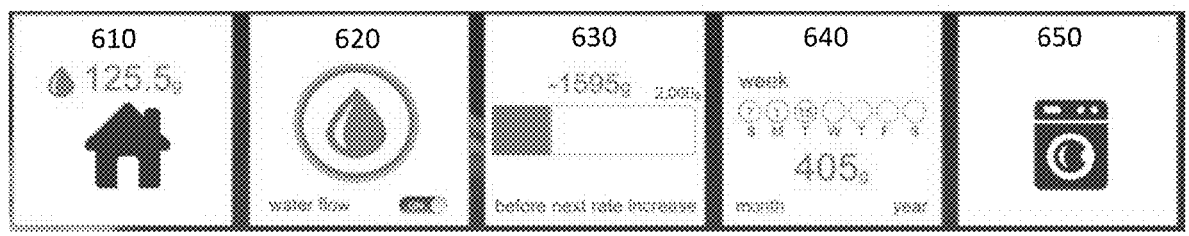
FIG. 6 is a view of a dashboard displaying water meter data according to an embodiment of the present disclosure.

FIG. 6 depicts dashboard 600 displaying water meter data according to an embodiment of the present disclosure. Dashboard 600 may display one or more pieces of information, including, but not limited to, daily usage 610, whether a leak is detected 620, goal tracking indicators 630, a calendar 640, and flow signatures 650. It should be appreciated that dashboard 600 may provide a daily usage in gallons, liters, or another form of measurement. Daily usage also may be displayed based on a location, such as an individual residential home or a city, in embodiments of the present disclosure. With respect to leak detection, it should be appreciated that a mechanism may be provided to turn on/off water flow. It should be further appreciated that dashboard 600 may provide a quantity of water that may remain before a rate increase may be incurred by a user. This may be depicted through the goal tracker in an embodiment of the present disclosure. Numerical and/or graphical displays may be utilized in the goal tracker in embodiments of the present disclosure. It should also be appreciated that dashboard 600 may provide calendar scheduling that may be based on a day, week, month, and/or year comparisons.

FIGS. 7A-7F depict screenshots of water meter system application 700A-700F respectively according to an embodiment of the present disclosure. Water meter system 100 (FIG. 1) and water meters 200A-500B (FIGS. 2A-5B) may provide water tracking on a daily, weekly, monthly, and/or any other frequency of usage basis that may be displayed in water meter system application 700A-700F. Water meter system application 700A-700F may provide for and display goal-setting in water usage, thereby managing costs and minimizing waste. Water meter system application 700A-700F may further provide managing water costs and may track use and alert users when another pricing tier is about to be reached. Water meter system application 700A-700F may provide ease of use and web and mobile applications that may allow the user to manage, monitor, interact with, and/or control water usage and monitoring with ease. It should be appreciated that water meter system application 700A-700F may provide a limited configuration that may be easy to understand and may provide simple graphics. It should further be appreciated that water meter system application 700A-700F may seamlessly connect with Nest®, Wink®, Amazon®, and other smart home applications.

It should be appreciated that water meters 200A-500B (FIGS. 2A-5B) may be utilized in various industries including, but not limited to, corporate locations and asset management; food and beverage; irrigation; individual residential homes; municipalities and utilities; multi-tenant, apartment, and condominium structures; and hotels. It should be appreciated that applying the water meter system in corporate locations and asset management may provide water use and comparison information per location, loss and risk mitigation, leak detection and damage prevention, insurance benefits, controlling water cost, and remote monitoring and homogenization of processes. It should be appreciated that applying the water meter system in food and beverage industries may provide managing water as a service cost, leak detection and damage prevention, a management-controlled valve, site-to-site comparisons, and insurance benefits. It should be appreciated that applying the water meter system to irrigation may provide set flow times, managing the flow of water by time or volume; tracking water use per cycle; monitoring environmental risks including, but not limited to, humidity, air temperature, and water temperature; minimizing loss; and connecting other ZigBee monitors via a hub. It should be appreciated that applying the water meter system in individual residential homes may conserve water and money, prevent loss and damage, reduce insurance costs, provide rain catchment, and manage water well and municipality prices. It should be appreciated that applying the water meter system to municipalities and utilities may provide integration into an advanced metering infrastructure (AMI) network, leak detection and isolation, may limit liability due to customer-controlled valves, prevent overpressure monitoring, and may provide quicker access to data and a higher resolution. It should be appreciated that applying the water meter system to multi-tenant, apartment, and condominium structures may provide water management per tenant, leak detection, flood damage prevention, reduction in vague shared water billing statements, management and/or tenant controlled valves, and insurance benefits. It should be appreciated that applying the water meter system to hotels may provide per room water service and use monitoring, leak detection and damage prevention, excessive water use management, charging customer per use and per room, and improved hot water use and tracking.

It should be appreciated that water meters 200A-500B (FIGS. 2A-5B) may measure and total a water flow of a primary inlet to a location, such as, a house, an office, or a bar. It should be appreciated that a display of a total volume of water flow in gallons or liters may be provided in embodiments of the present disclosure. It should further be appreciated that water meters 200A-500B (FIGS. 2A-5B) may set calendar dates to meet a city billing cycle. It should also be appreciated that water meters 200A-500B (FIGS. 2A-5B) may allow a user to select days to view water use and may allow the user to compare the water use to city billing cycles. It should be appreciated that waters 200A-500B (FIGS. 2A-5B) may be utilized to verify a city bill. It should be appreciated that water meters 200A-500B (FIGS. 2A-5B) may allow the user to select beginning and ending dates to view usage. It should be appreciated that water meters 200A-500B (FIGS. 2A-5B) may provide a notification when approaching a monthly water usage limit/threshold in which pricing may change. It should be appreciated that water meters 200A-500B (FIGS. 2A-5B) may provide user-controlled remote on/off operation of a water valve. It should be appreciated that water meters 200A-500B (FIGS. 2A-5B) may allow control of the system to be shared with anyone by utilizing a primary user account. It should be appreciated that water meters 200A-500B (FIGS. 2A-5B) may automatically shut the valve to test its function on a monthly cycle (or another predefined period of time). It should be appreciated that water meters 200A-500B (FIGS. 2A-5B) may provide a valve that may include a limit switch that may determine if the valve is open or closed.

It should be appreciated that water meters 200A-500B (FIGS. 2A-5B) may provide a user set flow alert. For example, if a number of gallons of water flows without interruption, then the user or owner may be notified and an inlet valve may be closed if no response is received within a specified period of time (i.e., 5 minutes) after the notification. It should be appreciated that the user may set the time period that may elapse before the inlet valve may be closed. It should be appreciated that the American Water Works Association (AWWA) provides flow standards of approximately one-half galloon per minute. It should also be appreciated that the flow produced by utilizing the water system and method may be less than approximately one ounce per minute. It should further be appreciated that the flow produced by utilizing the water system and method may be less than approximately one-fourth ounce per minute. It should be appreciated that water meters 200A-500B may provide for users to train the system to identify water flow types associated with different utilities, including, but not limited to, toilets, dishwashers, and irrigation. It should be appreciated that the user may set conservation targets and may be notified when a daily/monthly/yearly limit has been (or is about to be) reached. It should be appreciated that limits may be set based on weekday and/or weekend usage in some embodiments of the present disclosure.

It should be appreciated that water meters 200A-500B (FIGS. 2A-5B) may allow a user to set alerts that may monitor a percentage change of variables including, but not limited to, water flow totals in minute (or other) intervals, humidity level, air temperature, and/or water temperature. It should be also appreciated that user set pressure thresholds may provide categories including, but not limited to, high-critical, high, normal, low, and/or low-critical. It should be further appreciated that water meters 200A-500B may monitor flow irregularities for a duration of time, such as, water running for less than one hour and may monitor volume, such as, a maximum volume at any given time. It should be appreciated that water meters 200A-500B may evaluate trends in water use and set goals. It should also be appreciated that water meters 200A-500B may provide water meter automatic switches that may alternate between battery-powered and AC wall adapter power in embodiments of the present disclosure.

It should be appreciated that water meters 200A-500B (FIGS. 2A-5B) may increase the frequency of reporting of data that may determine details of how a value changes, when a threshold for a given reading is reached including, but not limited to, flow, totalization, and temperature. For example, if pressure is normally reported at a frequency of one hour and the threshold of a pressure change has been reached (e.g. the pressure has risen 10 psi in 1 hour), then the reporting frequency may change to 2 minutes and details regarding ongoing pressure change may be determined. If it is noted that within 10 minutes, pressure rises 2 psi per minute, then quicker action may take place than when only 1 psi over 40 minutes is recorded. It should be appreciated that a threshold trigger may be based on either a time duration or value measurement including, but not limited to, volume and temperature. It should further be appreciated that the value measurement may be a change in absolute value or a percentage change in embodiments of the present disclosure.

It should be appreciated that water meters 200A-500B (FIGS. 2A-5B) may provide sensing and reporting that may be based on data that may be transmitted from a gateway to a cloud server. It should be appreciated that specific rules may be triggered and may prompt action to be taken in embodiments of the present disclosure. It should be appreciated that rules may be user-specified, defined by the manufacturer, and/or may involve machine-learning over time. Rules may include, but are not limited to, sensor values changing past certain thresholds including, but not limited to, volume and measurement; sensor values changing outside of historical norms; and sensor values not being received. It should be appreciated that when a rule is triggered, the actions may include, but are not limited to, sending user notifications including, but not limited to e-mail, SMS, and/or app notifications; controlling a valve including closing the valve during a potential leak; displaying information in a dashboard or a report; and sending notifications or request to a third party including, but not limited to, a plumber and/or a landlord.

It should be appreciated that water meters 200A-500B (FIGS. 2A-5B) may provide logic run-time monitoring and threshold alarms. It should be appreciated that an ultrasonic sensor may continuously monitor water usage for a set duration and/or volume. It should be appreciated that two ultrasonic sensors may continuously monitor water usage for a set duration and/or volume without departing from the present disclosure. It should further be appreciated that any number of ultrasonic sensors may continuously monitor water usage for a set duration and/or volume without departing from the present disclosure. Water meters 200A-500B (FIGS. 2A-5B) may provide continuous sampling of water in embodiments of the present disclosure. It should be appreciated that a sensor may report activity when a flow is detected and a flow-timer may monitor water activity. It should be appreciated that water meters 200A-500B (FIGS. 2A-5B) may trend a flow-time for reporting to a user. For example, a time at the top of an hour may be recorded when irrigation may be turned on and water may flow. A sensor may register when a flow may begin and may send a flow-time start notification and volume reading to a server. For example, if no duration or volume thresholds have been exceeded, at twenty minutes, a timer may turn off and irrigation may stop. It should be appreciated that the sensor may recognize a flow change and may record when the flow is turned off.

It should further be appreciated that a server may store information in a database for reporting. It should be appreciated that a web app may display a report based on a user request. For example, at the top of the hour, irrigation may be turned on and water may flow. It should be appreciated that a sensor may register when the flow begins. It should further be appreciated that a flow-time start notification may be sent and a volume reading may be sent to the server. It should also be appreciated that a sensor may detect when a volume level may exceed a maximum, and a threshold alarm setting may be provided that may send a system alert to the server. It should be appreciated that the server may attempt to identify the problem and may take action by referring to user rule settings. It should be appreciated that the alert may be reported to and displayed on dashboard 600 (FIG. 6). It should be appreciated that water meters 200A-500B (FIGS. 2A-5B) may follow the user rule settings or established user rule settings. It should be appreciated that a sensor may run sampling every minute, every five minutes, or for any other duration of time that may update alert notification on dashboard 600. It should be appreciated that an alert may also be sent to managers or any other party. It should be appreciated that the server may identify the alert as red priority or a high priority and may shut off a valve in embodiments of the present disclosure.

It should be appreciated that water meters 200A-500B (FIGS. 2A-5B) may monitor and support the health of complementary systems that may be located in homes, farms, commercial systems, and multi-tenant water systems that may include, but are not limited to, water softeners, swimming pool valves that may provide an auto-fill feature, septic systems, and irrigation systems. It should be appreciated that water meters 200A-500B may prevent leaks in water pipes. In particular, water meters 200A-500B may prevent problems caused by water softeners that may constantly run to meet a demand and mask the sound of leaks. It should be appreciated that water meters 200A-500B may eliminate the need for an auto-fill valve that may continually run to maintain a pool water level, and water meters 200A-500B may prevent pools from overflowing and from constantly running, thereby saving consumers money and conserving water. It should be appreciated that water meters 200A-500B may help irrigation systems to maintain a flow volume, flow time, and/or pressure that may be consistent with historical norms and may help to correct abnormal measurements. It should also be appreciated that water meters 200A-500B may help to prevent irrigation systems from having a higher than normal flow and may help to ensure that irrigation systems run at programmed times. It should further be appreciated that water meters 200A-500B may help to prevent water that may constantly run from causing hydraulic overloads, negatively impacting septic system performance, and flooding drain fields.

It should be appreciated that water meters may support water softeners in operating within their normal environment and may prevent water softeners from becoming damaged. It should be appreciated that water meters 200A-500B (FIGS. 2A-5B) may identify or recognize broken or shorted water softener control switches and timers, incorrectly programmed control valves, control valves clogged by debris, internal leaks, and problems caused by insufficient salt doses or brine brink tank issues that may shorten water softener regeneration cycles or cause the softener to fail to produce enough soft water.

It should be appreciated that water meters 200A-500B (FIGS. 2A-5B) may provide heated water monitoring and may maintain energy requirements for heated water. It should be appreciated that water meters 200A-500B may provide a first water meter at a main water source and may provide a second water meter after a hot water source. It should be appreciated that water meters 200A-500B may monitor a total amount of water that may be used in an environment, a temperature of water at a source, an amount of hot water that may be used in an environment, a temperature at a hot water source, and a change in temperature that may occur during use. It should further be appreciated that water meters 200A-500B may monitor a time to cold measurement which may provide measuring a flow of water and temperature over time which may be utilized to estimate a time period before water may reach a cold threshold such as, a shower or a bath run time; and a time to heat measurement which may provide measuring a flow of water and temperature over time which may be utilized to estimate a time period before water may be at a maximum heat. It should also be appreciated that water meters 200A-500B may monitor an efficiency of heating water, heat metering in an open or closed system, and a heat energy value, such as the amount of energy that may be utilized to take a shower.

It should be appreciated that water meters 200A-500B (FIGS. 2A-5B) may be trained by a user and may provide water DNA signatures, monitor for regular and irregular patterns of water use, and may provide notifications when thresholds may be reached. It should further be appreciated that water meters 200A-500B may allow a user to select from a menu what water source is running including, but not limited to, a toilet, bath sink, kitchen, washing machine, irrigation, shower, bathtub, dishwasher, outdoor garden hose spout, water sources that may not be known, and other water sources. It should be appreciated that after a period of time water meters 200A-500B may trend volume, duration, and flow of water and may create a unique water DNA. It should also be appreciated that simple icons on a mobile device may allow the user to easily identify and map a water use DNA that may provide unique signatures for use patterns. It should be appreciated that water use and trends may be utilized to identify irregular behavior, such as, a scheduled irrigation flow that may provide a low or no flow at all. It should be appreciated that the user may set configurations that may alert the user if a threshold is met that may include, but is not limited, to, percentage change, irregular duration above and below normal flow, low flow, and high volume flow.

It should be appreciated that water meters 200A-500B (FIGS. 2A-5B) may provide abnormal usage notifications. It should further be appreciated that based on usage data, after a period of time, water meters 200A-500B may determine regular usage patterns. It should also be appreciated that water meters 200A-500B may identify irregularities and may send notifications that may be based on user settings. It should be appreciated that an example of how water meters 200A-500B may provide notifications may include, but is not limited to, when water softeners run at certain times, such as, nighttime, for certain durations and similar flow patterns appear outside of normal time period. It should be appreciated that this event may trigger a notification that may be based on the user's notification settings that may include, but is not limited to, e-mail and text messaging. It should be appreciated that another example of how water meters 200A-500B may provide notifications which may include, but are not limited to, when home appliances, such as, dishwashers and washing machines are generally run at semi-regular times with repeating flow characteristics. It should be appreciated that water meters 200A-500B may provide notifications when irrigation systems are on a timer and the user enters the irrigation schedule into water meters 200A-500B as a known usage of water to provide both unwanted water usage, such as, leaks or running outside of normal use, and verification of usage, such as confirming whether irrigation occurred when the user intended.

It should be appreciated that water meters 200A-500B (FIGS. 2A-5B) may be applied to gas applications and industries. It should be appreciated that water meters 200A-500B may be a gas meter system without departing from the present disclosure. It should further be appreciated that a gas meter system may provide a user flow alert in real-time and may automatically close a gas valve.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A water meter, comprising:
   two ultrasonic sensors placed in sensor ports in a top portion of a water meter body, the two ultrasonic sensors provided to monitor water flow and detect and trace leaks in real-time;
   a first input including a water temperature sensor that monitors water temperature;
   a second input including ambient sensors that monitor one or more of the following: air temperature and humidity around the water meter;
   a third input that communicates with online weather forecast information, wherein the first input, the second input, and the third input correlate to provide warnings about freezing pipes associated with the water meter;
   a ball valve configured to remotely close; and
   dual pressure sensors arranged on each side of the ball valve, wherein the dual pressure sensors are arranged to separate upstream pressure zones from downstream pressure zones and monitor pressure on each side of the ball valve when the ball valve is closed wherein the water meter provides heated water monitoring and maintains energy requirements for heated water by monitoring a total amount of water used in an environment, a temperature of water at a source, an amount of hot water used in an environment, a temperature at a hot water source, and a change in temperature that occurs during use.

2. The water meter according to claim 1, further comprising:
a power source made of a solar panel, an alternating current (AC) adapter, an external direct current (DC) battery, or another energy source, the power source connected to a power switch, the water meter having an automated flow detection feature.

3. The water meter according to claim 1, wherein the water meter is connected to a water meter application, the water meter application configured to display and notify a user of a water flow rate increase in real-time and also provide flow visualization, totalization of volume, metering data and settings to adjust flow sensitivity on a user-by-user basis, and notification when the user reaches a daily/monthly/yearly limit of a conservation target as set by the user, the water flow visualization including a graphical display of flow.

4. The water meter according to claim 1, wherein the ball valve is configured to remotely close and shut off water supplied to various locations.

5. The water mater according to claim 1, further comprising:
an angled sensor port arranged to extend from the water meter body and monitor a water temperature.

6. The water meter of claim 1, wherein the water meter monitors a time to cold measurement that provides for measuring a flow of water and temperature over time to estimate a time period before water may reach a cold threshold.

7. The water meter of claim 1, wherein the water meter monitors a time to heat measurement that provides for measuring a flow of water and temperature over time to estimate a time period before water is at a maximum heat.

8. The water meter of claim 1, wherein the water meter monitors an efficiency of heating water, heat metering in an open or closed system, and a heat energy value.

9. A method of operating a metering system, comprising the steps of:
monitoring water temperature using a first input including a water temperature sensor;
monitoring one or more of the following: air temperature and humidity around the metering system using a second input including ambient sensors;
using a third input, communicating with online weather forecast information, wherein the first input, the second input, and the third input correlate to provide warnings about freezing pipes associated with the water meter;
monitoring water flow and detecting and tracing leaks in real-time, by a processor, utilizing two ultrasonic sensors integrated into a water meter body;
identifying broken or shorted water softener control switches and timers, incorrectly programmed control valves, control valves clogged by debris, internal leaks, and problems caused by insufficient salt doses or brine tank issues that shorten water softener regeneration cycles or cause the water softener to fail to produce enough soft water;
providing water flow visualization, totalization of volume, metering data, and notification when a user reaches a daily/monthly/yearly limit of a conservation target as set by the user on a dashboard associated with the metering system, the water flow visualization including a graphical display of flow; and
monitoring pressure within the metering system using dual pressure sensors arranged on each side of a ball valve, wherein the dual pressure sensors monitor pressure on each side of the ball valve when the ball valve is closed.

10. The method according to claim 9, further comprising:
powering the water meter system with a solar panel, an alternating current (AC) adapter, an external direct current (DC) battery, or another energy source.

11. The method according to claim 9, further comprising:
notifying a user in real-time of flow irregularities within the metering system.

12. The method according to claim 9, further comprising:
transmitting detected leaks to the metering system from the two ultrasonic sensors.

* * * * *